US012615186B2

(12) United States Patent　　(10) Patent No.: US 12,615,186 B2
Busche et al.　　(45) Date of Patent: Apr. 28, 2026

(54) SYSTEMS AND METHODS FOR STORING AND TRANSPORTING CONFIGURATION DATA TO EDGE SERVERS

(71) Applicant: Level 3 Communications, LLC, Broomfield, CO (US)

(72) Inventors: Matthew Busche, Lakewood, CO (US); Laurence Lipstone, Calabasas, CA (US); William Power, Boulder, CO (US)

(73) Assignee: Level 3 Communications, LLC, Denver, CO (US)

( * ) Notice: Subject to any disclaimer, the term of this patent is extended or adjusted under 35 U.S.C. 154(b) by 291 days.

(21) Appl. No.: 18/524,653

(22) Filed: Nov. 30, 2023

(65) Prior Publication Data

US 2024/0179059 A1　　May 30, 2024

Related U.S. Application Data

(60) Provisional application No. 63/385,498, filed on Nov. 30, 2022.

(51) Int. Cl.
　*H04L 41/08*　　(2022.01)
　*H04L 41/082*　　(2022.01)
　*H04L 41/0866*　　(2022.01)
(52) U.S. Cl.
　CPC ........ *H04L 41/0879* (2013.01); *H04L 41/082* (2013.01); *H04L 41/0866* (2013.01)
(58) Field of Classification Search
　CPC ............... H04L 41/0879; H04L 41/082; H04L 41/0866; H04L 41/046; H04L 41/0853; H04L 41/22; H04L 43/028; H04L 41/0806; H04L 41/0843; H04L 41/0816
See application file for complete search history.

(56) References Cited

U.S. PATENT DOCUMENTS

| | | | | |
|---|---|---|---|---|
| 10,749,747 | B1 * | 8/2020 | Bueter | ................. H04L 41/064 |
| 11,283,677 | B2 * | 3/2022 | Wood | ................. H04L 41/0889 |
| 11,824,938 | B1 * | 11/2023 | Quaresma | ............... H04L 67/12 |
| 11,921,758 | B2 * | 3/2024 | Patil | .................... G06F 16/1873 |
| 12,242,892 | B1 * | 3/2025 | Burnett | ............... G06F 9/45533 |
| 12,399,913 | B1 * | 8/2025 | Toulme | ................. G06F 16/287 |
| 2008/0010256 | A1 | 1/2008 | Lindblad | |
| 2018/0173812 | A1 | 6/2018 | Agarwal | |
| 2022/0035770 | A1 * | 2/2022 | Silverman | ........... G06F 16/2379 |
| 2023/0393443 | A1 * | 12/2023 | Marquez | .............. G05B 19/042 |
| 2024/0106704 | A1 * | 3/2024 | Chau | ...................... H04L 43/14 |

OTHER PUBLICATIONS

International Search Report and Written Opinion of the International Searching Authority, dated Mar. 13, 2024, Int'l Appl. No. PCT/US2023/081817, Int'l Filing Date Nov. 30, 2023, 13 pgs.

* cited by examiner

*Primary Examiner* — Alex Tran

(57) ABSTRACT

Systems and methods for ingesting, managing, and distributing configuration data in one or more computing networks are provided. In examples, a flexible configuration definition framework is provided to allow for simplified ingestion, management, and distribution of configuration data to various computing devices in complex networks. Rather than table data, the framework permits expression of configuration settings in a non-relational, text-based data format to allow easy searching and filtering of configuration data and targeted distribution of data to machines and applications within the network(s).

18 Claims, 4 Drawing Sheets

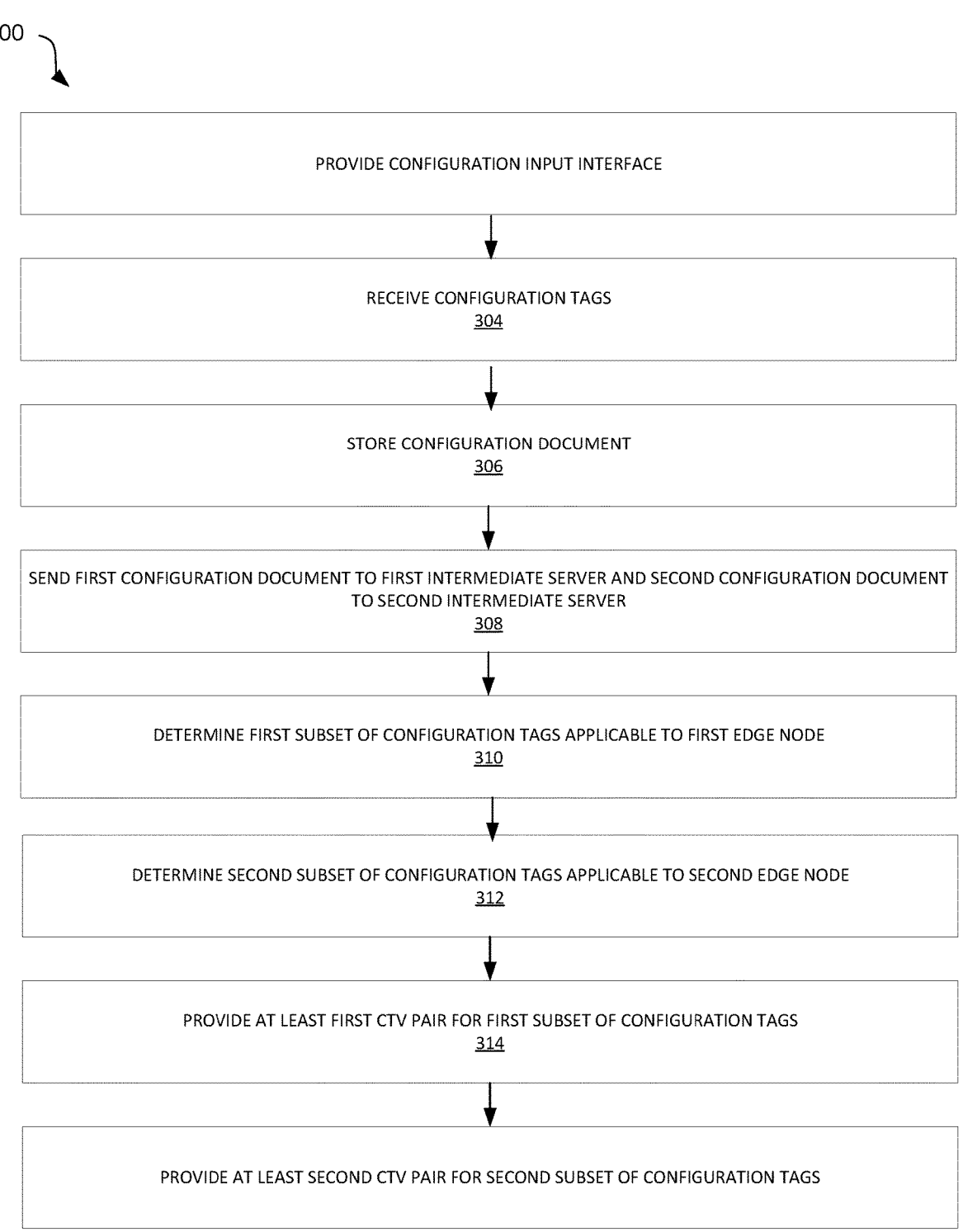

300

PROVIDE CONFIGURATION INPUT INTERFACE

RECEIVE CONFIGURATION TAGS
304

STORE CONFIGURATION DOCUMENT
306

SEND FIRST CONFIGURATION DOCUMENT TO FIRST INTERMEDIATE SERVER AND SECOND CONFIGURATION DOCUMENT
TO SECOND INTERMEDIATE SERVER
308

DETERMINE FIRST SUBSET OF CONFIGURATION TAGS APPLICABLE TO FIRST EDGE NODE
310

DETERMINE SECOND SUBSET OF CONFIGURATION TAGS APPLICABLE TO SECOND EDGE NODE
312

PROVIDE AT LEAST FIRST CTV PAIR FOR FIRST SUBSET OF CONFIGURATION TAGS
314

PROVIDE AT LEAST SECOND CTV PAIR FOR SECOND SUBSET OF CONFIGURATION TAGS

Fig. 3

SYSTEMS AND METHODS FOR STORING AND TRANSPORTING CONFIGURATION DATA TO EDGE SERVERS

CROSS-REFERENCE TO RELATED APPLICATIONS

This application claims the benefit of U.S. Provisional Application No. 63/385,498 filed Nov. 30, 2022, entitled "Systems and Methods for Storing and Transporting Configuration Data to Edge Servers," which is incorporated herein by reference in its entirety.

BACKGROUND

Configuration information in a complex computing network may be voluminous and difficult to define, distribute, and maintain. For example, edge computing is becoming increasingly prevalent. In edge computing, an application or service may be operated on multiple edge servers, and the edge server closest to a client device making a request may respond to such request, thereby reducing latency and unnecessary transport of data across a network. However, a computing network may include thousands of edge servers hosting application instances, and those application instances may need to be coordinated through configuration data. For example, the configuration data may define both machine and application behaviors, such as roles, group memberships, timeout settings, etc. Traditional, centralized relation databases and table structures that store such configuration data may be unwieldy in an edge computing environment.

It is with respect to this general technical environment that aspects of the present disclosure are directed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In aspects, the present application describes a system comprising at least one processing circuit and memory, operatively connected to the at least one processing circuit and storing instructions that, when executed by the at least one processing circuit, cause the system to perform a method. In examples, the method may comprise: storing at least one configuration document comprising a plurality of configuration tags, wherein the at least one configuration document comprises a non-relational, text-based data format, and wherein, for each configuration tag of the plurality of configuration tags, a configuration tag name and a configuration setting array, and wherein the configuration setting array comprises at least one configuration value and at least one configuration scope. In examples, the method may further include determining a first subset of the configuration tags of the at least one configuration document applicable to a first edge node of the network; determining a second subset of the configuration tags of the at least one configuration document applicable to a second edge node of the network; providing at least a first configuration tag-value (CTV) pair for the first subset of the configuration tags; and providing at least a second CTV pair for the second subset of the configuration tags.

Other aspects of the present application will become apparent from the below descriptions and claims.

BRIEF DESCRIPTION OF THE DRAWINGS

Non-limiting and non-exhaustive examples are described with reference to the following Figures.

FIG. 3 is a flow chart depicting an example method according to aspects of the present application.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Figure 1:
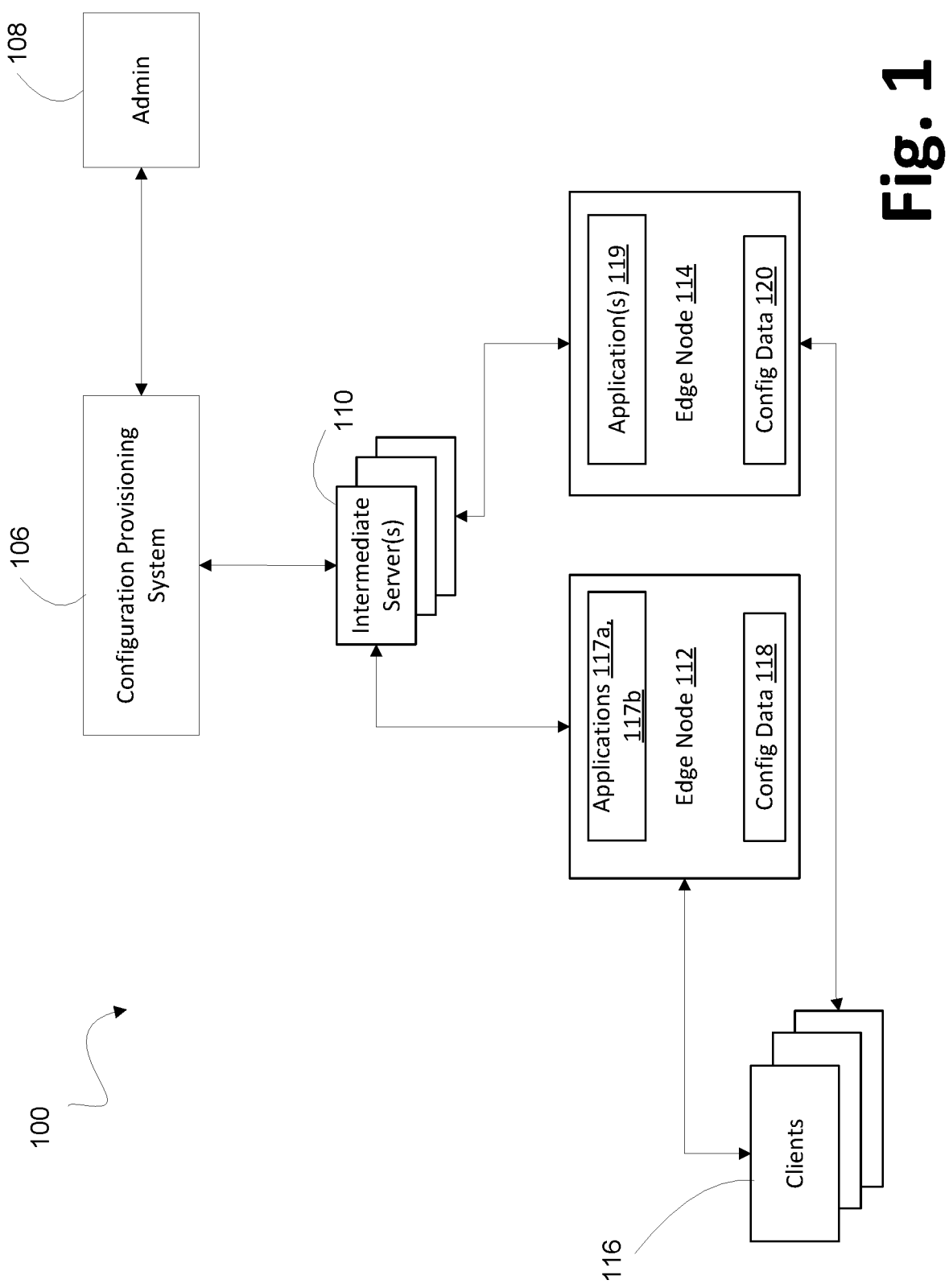
FIG. 1 is a block diagram depicting an example computing system according to aspects of the present application.

FIG. 1 illustrates a system 100 for ingesting, storing, and delivering configuration data. In examples, components of system 100 may operate as a content delivery network (CDN), although the present application is not necessarily limited to any particular type of network. In examples, the system 100 may comprise a configuration provisioning system 106. Configuration provisioning system 106 may provide an interface to allow configuration data to be received, edited, and/or deleted (e.g., by one or more administrator system(s) 108). For example, the configuration provisioning system 106 may include an application programming interface (API) that can accept programmatic commands to receive, edit, or delete configuration data stored by the configuration provisioning system 106. In other examples, the configuration provisioning system may provide or facilitate a user interface (e.g., displayed on one or more administrator system(s) 108) to receive, edit and/or delete configuration data, as further described herein. Although only one configuration provisioning system 106 and one administrator system 108 are depicted, multiple of each may be implemented.

System 100 may further comprise one or more intermediate server(s) 110, and edge nodes 112 and 114. In examples where the system 100 may operate as a CDN, one or more of the intermediate servers 110 may comprise a control core, such as nonexclusively described in U.S. Patent Application Publication No. 2019/0327140, which is incorporated by reference herein. In examples, edge nodes 112 and 114 are used to provide content and/or services to clients 116. In examples, clients 116 may comprise client devices that access services and/or content at edge nodes 112 and 114. As discussed, system 100 may comprise a CDN where content and/or computing services are delivered to clients via a logically closest edge node (e.g., edge node 112 or 116).

In nonexclusive examples, a content delivery network (CDN or CD network) distributes content (e.g., resources) efficiently to clients on behalf of one or more content providers (network customers). Customers of the CDN (e.g., content providers) provide their content (e.g., resources) via origin sources (origin servers or origins). A CDN can also provide an over-the-top transport mechanism for efficiently sending content in the reverse direction—from a client to an origin server. Both end-users (clients) and content providers benefit from using a CDN. Using a CDN, a content provider is able to take pressure off (and thereby reduce the load on) its own servers (e.g., its origin servers). Clients benefit by being able to obtain content more consistently and with fewer delays.

Typically, multiple edge nodes (e.g., edge nodes 112 and 114) in the CDN can process or handle any particular client request for content (e.g., for one or more resources). In examples, a rendezvous system associates a particular client request with one or more "best" or "optimal" (or "least worst") edge node to deal with that particular request. The "best" or "optimal" edge node (e.g., edge node 112 or 114) may be one that is close to the client 116 (by some measure of network cost) and that is not overloaded. Generally, the chosen edge node 112 or 114 (i.e., the edge node chosen by the rendezvous system for a client request) can deliver the requested content to the client 116 or can direct the client 116 to somewhere that the client 116 can try to obtain the requested content. A chosen edge node 112 or 114 need not have the requested content at the time the request is made, even if that chosen edge node 112 or 114 eventually serves the requested content to the requesting client. As used herein, each node may comprise one or more computing devices and storage devices, which are generally co-located.

In the CDN example, one or more intermediate server 110 operating as a control core may include a component dedicated to accepting and managing configuration data. The CDN may have or provide default policies and procedures for delivery and/or handling of subscriber content. These system defaults may be specified and/or contained in one or more system configuration files or objects. In addition, customers of the CDN (e.g., content providers) may customize aspects of delivery and/or handling of their content by the CDN. The customizations may be specified and/or contained in one or more customer configuration files or objects, such as scripts.

Configurations may be maintained, controlled, and administered via administrator system 108, at least in part, by a configuration mechanism that may be accessed via an appropriate interface, such as a RESTful API. The configuration information may define, for a particular customer, for the system 100 as a whole, and/or for particular devices or applications resident on the system 100, any number of configuration properties. In the nonexclusive CDN example, this may include how the CDN should handle customer properties (e.g., how the CDN should service requests for that customer's resources). This may include alias hostnames, origin servers from which to fill, and all policies associated with content associated with that customer.

Administrator system 108 may be provided with an interface for an administrator to upload, modify, and/or delete configuration data. Configuration data may be used to inform servers of the system 100 of cluster group membership, to inform servers of their role in a CDN hierarchy (or other server hierarchy), control routing of fill traffic within the CDN, delineate which Internet protocol (IP) addresses belong to the CDN versus external systems, control application-specific settings, such as timeouts to use when reading from sockets, etc., and/or or machine-specific settings.

The configuration data 118, 120 stored at intermediate server(s) 110 (such as control core(s)) may be further distributed to edge nodes 112 and 114. For example, configuration data 118, 120 may be distributed from intermediate server(s) 110 to edge nodes 112 and 114 each time an update to the configuration data is received at intermediate server(s) 110. In other examples, the configuration data 118, 120 is distributed from intermediate server(s) 110 to an edge node, such as edge node 112 or 114, periodically or when the edge node (e.g., 112 or 114) requests it. For example, a cache or other component at the edge node may receive a request from application(s) 117a or 117b (or other component, such as the operating system) for the configuration data 118, determine that the configuration data is not stored at the edge node 112 (or has expired), and request the configuration data from the intermediate server(s) 110. In other examples, the configuration data 118 may be determined by edge node 112 from configuration documents (as discussed further below). As discussed below, the configuration data 118, 120 (which may take the form of configuration documents, configuration files, configuration tag-value (CTV) pairs) may then be stored in a cache associated with the edge node. For example, edge nodes 112 and 114 may each comprise one or more computing devices, memory, and associated cache storage to store recently requested configuration data 118, 120 at edge nodes 112 and 114 for use by application(s), operating system(s), or other components, such as applications 117a, 117b, 119.

In examples described herein, the configuration data may be provided in a non-relational, text-based data format, such as JavaScript Object Notation (JSON), though the present application is not limited to a particular non-relational, text-based data format. The JSON format may comprise specific data types, comprising strings of characters, numbers, arrays, Boolean values, and the like. In examples, the use of a non-relational, text-based data format such as JSON allows for the use of hypertext transfer protocol (HTTP)-based protocols to transport data between and among the elements of system 100, such as configuration provisioning system 106, intermediate server(s) 110, and edge node(s) 112, 114.

As discussed below, present systems provide an alternative to storing configuration data in table format with dedicated columns. Rather, a flexible, agnostic framework for storing and transporting configuration data to edge nodes is provided. The present systems and methods allow for modeling of any configuration data that might be needed when running a distributed system (e.g., comprising of many different applications and devices). In addition, present systems and methods provide a mechanism to specify how metadata can be represented and used in the framework. In examples, this metadata allows relationships between configuration data elements to be defined. For example, JSON tags can be used to define selectors that allow different network elements to get different configuration data values. In addition to simple selectors, the metadata can be used as the basis of an 'SQL like' query language that can control which configuration elements are seen by groups of servers or other computing devices within a network.

The presently disclosed systems and methods facilitate easy management and distribution of configuration settings based on a variety of scoping parameters. For example, it may be desirable to send operating-system kernel TCP configurations to all network devices in North America that are connected to a network having a particular autonomous system number (ASN), while a different configuration is sent to all machines in Europe. In another example, a particular configuration setting may be sent to all servers that are running a domain name server (DNS) application, regardless of location. In another example, a first configuration setting may be sent to all servers running a DNS application in an externally facing production network, but a second configuration setting may be sent to all servers running the DNS application in an internal network. In other examples, particular servers within a network may be targeted for a configuration change based specifically on a server identifier (such as a MAC address). Present systems and methods facilitate the management and distribution of configuration information to multiple levels of network devices targeting different levels of a software stack, from operating system kernel to application layer.

In examples, configuration information may be stored in, and/or derived from, configuration document(s) in a non-relational, text-based format such as JSON. The configuration document(s) may express configuration information in terms of configuration tags that are defined by a configuration tag name and a configuration setting array. The configuration document(s) may also define value(s) for particular tag(s) based on the configuration setting array, the requesting agent, and other information. The configuration document(s) may be searchable and filterable to scope a subset of configuration tags or settings to be included in a downstream distribution of configuration document(s).

Figure 2:
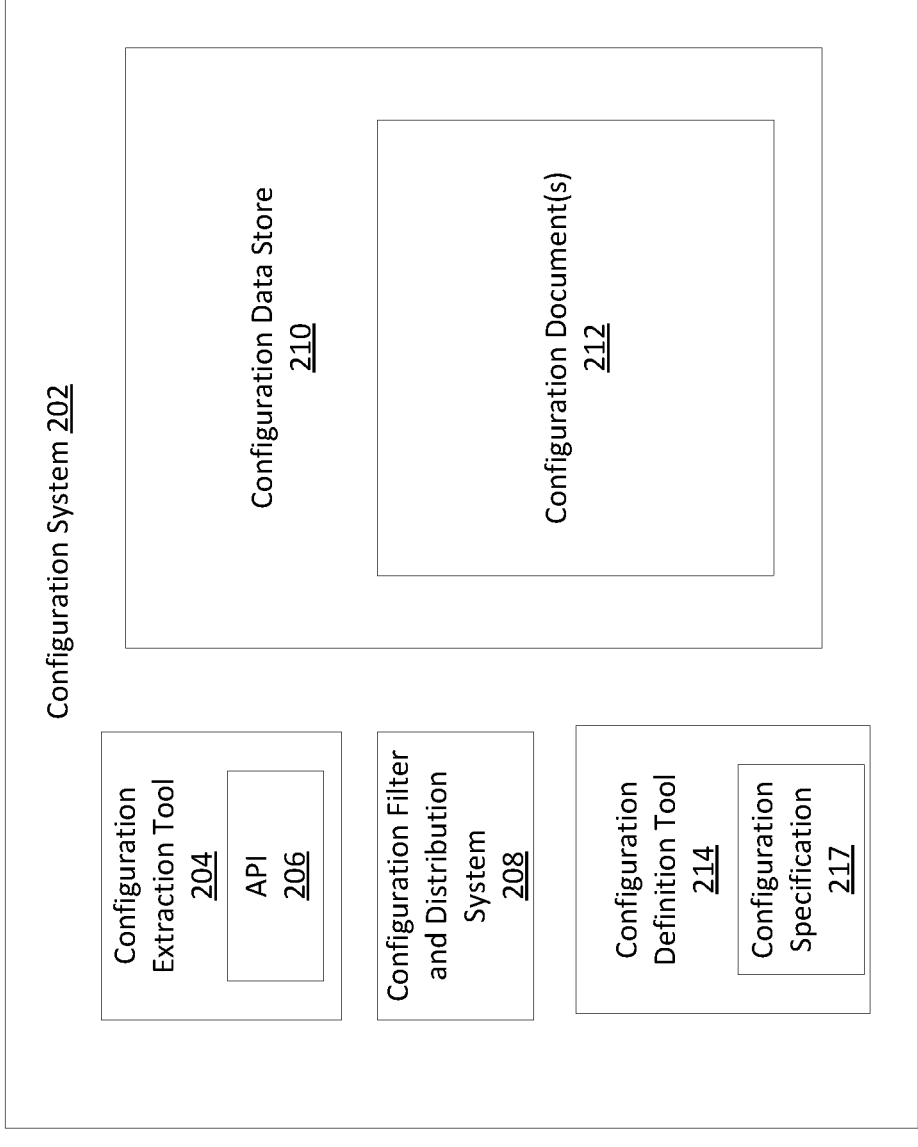
FIG. 2 is a block diagram depicting an example configuration system according to aspects of the present application.

In examples, one or more of the configuration provisioning system 106, intermediate server(s) 110, and edge node(s) 112, 114 may comprise some or all of a configuration system 202, as described with reference to FIG. 2. In examples, some portions of the configuration system 202 may be distributed across different levels of a network hierarchy, such as configuration provisioning system 106, intermediate server(s) 110, and edge node(s) 112, 114. In examples, configuration system 202 may comprise a configuration extraction tool 204 (which includes an application programming interface (API) 206), a configuration definition tool 214 (which includes a configuration specification 217), a configuration filter and distribution system 208, and a configuration data store 210 storing one or more configuration document(s) 212. Example operations and functions of the components of configuration system 202 are described below.

In examples, configuration definition tool 214 may comprise one or more systems for allowing users to define configuration tags and store such tags in one or more configuration document(s) 212 in a configuration data store 210. In examples, the configuration definition tool 214 may store or have access to a configuration specification 217. The configuration specification 217 may be similar to a JSON schema, but configuration specification 217 may allow for encoding of additional metadata about a configuration tag. In examples, the configuration specification 217 lists the tags that are permitted to be defined for a particular configuration document 212. In some examples, the configuration definition tool 214 may also include an interface that is accessible, e.g., by administrator system 108, to configure tags according to what is permitted by the configuration specification 217. In examples, the interface may comprise a graphical user interface, an application programming interface, or otherwise. In examples, the configuration definition tool 214 may enforce any rules for configuration tag(s) or configuration document(s) 212 that are required by the schema. For example, the configuration definition tool 214 may require that any tags to be stored in a configuration document 212 meet certain minimum requirements or particular syntax(es) before being accepted and stored.

One non-exclusive, example configuration specification 217 is described below. In this example configuration specification, each tag is a separate JSON object that includes some or all of the following properties: (a) description: a text description of each tag; (b) value: an object that defines the value type, and constraints on value range; (c) settings: if a configuration document 212 is found to be missing the tag, the tag is added to the configuration document 212 with these default settings; (d) immutable: an optional Boolean property which if true makes settings for the tag read-only; in examples, this may normally be combined with the settings property; (e) required: a list of sets of tag values—any agent that has tag values that match one of these sets is required to have a setting for this tag; (f) optional: a list of sets of tag values—any agent that has tag values that match one of these sets may be assigned a setting for this tag (e.g., this property might be used for filtering configuration documents 212 or to specify the form of a provisioning graphical user interface screen; (g) scope: scope is an object with two properties: priority and usage—the priority is a list of tags that may be used to limit the scope a setting. In examples, the order-of-appearance of tags in the priority list may be used to determine which setting applies to an agent when that agent satisfies the scoping-tags for more than one setting. The usage property may be a list of strings that each express a valid scoping-tag combination. A snippet of a non-exclusive example of a configuration specification 217 is shown below. In this non-exclusive example, the permitted specifications for an "agent:ip" tag are defined for an "agent_id" configuration document:

```
{
    "key": {
        "type": "int",
        "name": "agent_id"
    },
    "tags": {
        "agent: ip": {
            "description": "Primary IP address of the host.",
            "required": [{ }],
            "value": {
                "type": "ip"
            },
            "scope": {
                "priority": [
                    "agent_id"
                ],
                "usage": [
                    "agent_id"
                ]
            }
        },
        ...
    }
}
```

Other example configuration specifications 217 are possible and contemplated.

As discussed, configuration document(s) 212 may be generated based on tags defined using configuration definition tool 214 (according to the configuration specification 217). In other examples, configuration document(s) 212 may be received from other source(s). In examples, configuration document(s) 212 comprise configuration data stored in a non-relational, text-based format such as JSON. A non-exclusive example data model for the configuration document(s) 212 is discussed below. In examples, each configuration document 212 comprises a plurality of configuration tags. Each configuration tag may be defined by a configuration tag name and a configuration setting array.

In examples, the configuration tag name may be expressive and include a domain and a property. The domain may, in examples, comprise the most specific entity to which all values of the configuration setting applies (such as an agent, a network, or a component name). In examples, an agent may comprise a specific computing device or a specific Ethernet card of a device. In examples, the property may comprise a description of a property to which a configuration value applies, such as a role, an IP address, an alarm threshold, etc.). The expressive configuration tag name may, in examples, (a) aid in an understanding of the purpose, usage, and scope of a tag and its associated setting array; and (b) aid in the selection (e.g., filtering) of tags or settings that are relevant to a particular configuration tag consumer (such as an agent).

In examples, each configuration tag may comprise a JSON object, and each tag object may have a property "settings" of a type array ("setting array"). In examples, each member of the setting array may comprise a separate JSON object and may include at least one configuration value and at least one configuration scope. In examples, the configuration value may be a parameter value of a property (which may be of any type: string, number, Boolean, object, array, or null). The configuration scope may define the set of tag-value pairs that limits the set of agents to which the setting applies.

A snippet of a non-exclusive example of a configuration document 212 is shown below. In this non-exclusive example, an "agent:ip" tag definition is an example tag that may be stored in a configuration document 212:

```
{
  "tags": {
    "agent:ip": {
      "settings": [
        {
          "value": "192.0.2.1",
          "scope": {
            "agent_id": 9999991
          }
        },
        {
          "value": "192.0.2.2",
          "scope": {
            "agent_id": 9999992
          }
        },
        {
          "value": "192.0.2.3",
          "scope": {
            "agent_id": 9999993
          }
        },
        {
          "value": "192.0.2.4",
          "scope": {
            "agent_id": 9999994
          }
        },
        {
          "value": "192.0.2.5",
          "scope": {
            "agent_id": 9999995
          }
        },
        {
          "value": "192.0.2.6",
          "scope": {
```

-continued

```
            "agent_id": 9999996
          }
        },
        {
          "value": "192. 0.2.7",
          "scope": {
            "agent_id": 999997
          }
        },
        {
          "value": "192.0.2.8",
          "scope": {
            "agent_id": 9999998
          }
        }
      ]
    },
    ...
  }
}
```

In the above simple example, each setting object of the setting array for the agent:ip tag is defined to a have a different value for its defined scope. In this example, a particular "value" (192.0.2.3) is specified for a particularly defined scope (e.g., when the agent_id is equal to a particular identifier (9999993)).

In other non-exclusive examples, the scope itself may be defined indirectly by reference to one or more other configuration tag setting(s) and/or scope(s). For example, the "agent:itm_network" tag may be defined with the following setting array:

```
"agent:itm_network": {
  "settings": [
    {
      "value":
      "prod1",
      "scope": {
        "agent_id": 9999991
      }
    },
    {
      "value":
      "prod1",
      "scope": {
        "agent_id": 9999992
      }
    },
    {
      "value":
      "prod2",
      "scope": {
        "agent_id": 9999993
      }
    },
    {
      "value":
      "prod2",
      "scope": {
        "agent_id": 9999994
      }
    }
  ]
},
```

Continuing the above example, the "agent:tg_color" tag may be defined with a setting array that depends from the setting array for the "agent:itm_network" tag and the value of the "agent_id":

```
"agent:tg_color":
{ "settings":
  [
    {
      "value":
      "black",
      "scope": {
        "agent:itm_network": "prod1"
      }
    },
    {
      "value":
      "black",
      "scope": {
        "agent_id": 9999991
      }
    },
    {
      "value":
      "black",
      "scope": {
        "agent_id": 9999993
      }
    },
    {
      "value":
      "black",
      "scope ": {
        "agent_id": 9999995
      }
    },
    {
      "value":
      "white",
      "scope ": {
        "agent_id": 9999997
      }
    },
    {
      "value":
      "white",
      "scope": {
        "agent_id": 9999999
      }
    },
    {
      "value":
      "white",
      "scope": {
        "agent_id": 9999911
      }
    }
  ]
},
```

In examples, some scopes for a particular tag (e.g., tagC) may be defined in terms of the values of multiple other tags (e.g., if tagA=1 and tagB=2, then tagC=3, etc.). In addition, multiple tag scopes may apply to the same agent, and any conflicts may be resolved by setting a priority property for the tags so that a tag will always resolve to a single value. For example, as discussed, each "scope" may include a priority property, which is a list of configuration tags. In examples, the order of the tags in the priority list will determine which value applies to an agent when the agent satisfies the scope for more than one setting in the setting array. Further, not all agents will have a value applied for all tags. Other example configuration documents 212 are possible and contemplated.

In examples, referring back to FIG. 2, the configuration extraction tool 204 may include an API 206 via which configuration tag consumer(s) (such as agent(s)) may request configuration tag-value (CTV) pairs or configuration files. For example, an agent or other configuration tag consumer (e.g., a particular server of edge node 112 or 114, a particular port or Ethernet card thereof, a particular application operating thereon, etc.) may query the API 206 for the applicable value of one or more particular configuration tag(s). The configuration extraction tool 204 may access the applicable configuration document(s) 212 to determine the correct value for the configuration tag(s) based on the setting array(s) for the particular configuration tag(s) and other information passed with the request (e.g., an agent identifier (agent_id) for the requesting agent or the agent about which the configuration tag consumer is inquiring). Determining the correct value for the tag(s) may be simple (e.g., based only on the agent_id passed in the request), such as the "agent:ip" tag discussed above. In other examples, determining the correct value may be more complex (e.g., based on the agent_id passed in the request and additional values that must be derived from other tag settings). For example, with respect to the example configuration document 212 discussed above, the determination of the correct value for the "agent:tg_color" tag may be determined only after determining the correct value for the "agent:itm_network" tag based on the agent_id passed with the configuration file request. Other nested determinations of values for different tags may be employed. Once the correct value(s) are determined, the CTV pair(s) may be returned to the requesting configuration tag consumer.

In examples, an agent may also submit through the API 206 a configuration file request, which may include an agent identifier (e.g., agent_id) value and an indication of a configuration file template that includes tag names for which values are needed. The configuration extraction tool may search the relevant configuration document(s) 212 for the tag names included in the specified configuration file template, substitute the correct value for the tag name in the configuration file template, and return a configuration file (e.g., the configuration file template with the applicable value(s) substituted for the tag name(s) in the template). In examples, configuration template(s) may be stored, e.g., in the configuration data store 210 and accessed by the configuration extraction tool 204 so that a configuration file request need only include an indicator of the correct template (rather than passing a full template with the request). As used herein, providing the template with the configuration file request or an indicator (e.g., identifier) of the template will be considered providing an indication of the template. As discussed, determining the correct value to substitute into the configuration file may be simple (e.g., based only on the agent_id passed in the configuration file request), such as the "agent:ip" tag discussed above. In other examples, determining the correct value to substitute into the configuration file may be more complex (e.g., based on the agent_id passed in the configuration file request and additional values that must be derived from other tag settings). Other nested determinations of values for different tags may be employed. Once the correct value(s) are determined, the CTV pair(s) may be returned to the requesting configuration tag consumer in the configuration file(s). In this manner, relatively complete configuration files that may be needed/used by the tag consumer may be generated by the configuration extraction tool 204 in response to the configuration file request.

In examples, the configuration filter and distribution system 208 may comprise a utility that can filter the configuration documents 212 or the information in configuration documents 212 to only configuration tags or documents applicable to a downstream consumer of the configuration tags. For example, in the hierarchical system of FIG. 1, configuration provisioning system 106 may include a configuration data store 210 that includes all of the configuration documents 212 available to system 100. A configuration filter operating at the configuration filter and distribution system 208 of configuration provisioning system 106 may filter the configuration information in the configuration document(s) 212 before distributing reduced configuration document(s) 212 to particular intermediate server(s) 110. In examples, this may include excluding certain configuration document(s) 212 from being distributed to an intermediate server 110 and/or filtering information included within particular configuration document(s) 212 that are distributed. For example, if the system 100 is a CDN, then the intermediate server(s) 110 may comprise multiple control cores serving different edge node(s) (such as edge node(s) 112, 114). The configuration filter and distribution system 208 of configuration provisioning system 106 may filter the configuration document(s) 212 to include only configuration documents 212 or tag(s) or setting(s) within such documents having scope(s) that apply to agents serviced by a particular control core. As such, the configuration provisioning system 106 may provide different configuration document(s) 212 to a first intermediate server 110 than it does to a second intermediate server 110 based on the role of each intermediate server 110 in the system 100 and the agent(s) that the particular intermediate server 110 servers. In examples, this limits the amount of configuration information that needs to be replicated and kept synchronized in system 100. In examples, each of the intermediate server(s) 110 includes a configuration data store 210 to store the configuration document(s) 212 that are distributed to that intermediate server 110.

Similarly, a configuration filter and distribution system 208 operating at an intermediate server 110 may further filter configuration document(s) 212 based on the needs of downstream node(s), such as edge node(s) 112, 114. For example, edge node 112 may include a first set of computing device(s) (such as servers) running a first set of application(s) 117a, 117b. Edge node 114 may include a second set of computing device(s) (such as servers) running a second set of application(s) 119. As such, an intermediate server 110 may provide different configuration document(s) 212 to edge node 112 than it does to edge node 114. In examples where the (filtered) configuration document(s) 212 are distributed to the edge node(s) 112, 114, the edge node(s) 112, 114 may each include a configuration extraction tool 204 (as described above). The application(s) or other components that require configuration value(s) may then query the local instantiation of the configuration extraction tool 204 (e.g., through API 206). In other examples, the configuration document(s) 212 are not distributed all the way to the edge node(s) 212, and the edge node(s) 112, 114 may query a configuration extraction tool 204 (e.g., through API 206) operating at an intermediate server 110 when the edge node 112, 114 does not have valid, cached configuration data (e.g., 118, 120). In examples where configuration document(s) 212 are distributed to edge nodes 112, 114, each of the edge nodes 112, 114 includes a configuration data store 210 to store the configuration document(s) 212 that are distributed to that edge node 112, 114.

In examples, the filtering and distribution of configuration document(s) 212 may operate on a push or pull basis. For example, an intermediate server 110 may query the configuration filter and distribution system 208 operating at the configuration provisioning system 106. The query may include an indication of the agents served by the intermediate server 110 or the particular tag(s) for which configuration documents 212 are needed. In other examples, the configuration provisioning system 106 may determine relevant configuration document(s) 212 or tag(s) for a particular intermediate server 110 and push the appropriately filtered configuration document(s) 212 periodically, when updated, or otherwise.

One non-exclusive example of filtering is shown and discussed below. In this example, configuration filter and distribution system 208 may read a configuration document 212 from stdin, apply a filter specification (set on the command line), and write a filtered configuration object to stdout: cat CTV.json|CTV-filter CTV_filter_999997.json>CTV_999997.json.

An enumerate option may also be used to cause every selected setting to be enumerated for each agent_id along with a corresponding replacement of all listed constraints with a single agent_id constraint. The following CTV filter specification might be used to extract only settings needed by "sampleapp 999997." It selects all sampleapp-related component properties for agent 999997, but also includes the IP addresses and roles for all agents (e.g., so that, for example, the sampleapp can retrieve load inject reports from all caching servers.) In examples, the configuration filter and distribution system 208 could be used to filter CTV data delivered to an agent. It might also be used in notify scripts to select a subset of CTV data relevant to a particular application; although in examples, CTV resolution will suffice. A non-exclusive example follows:

```
"select": [
    {
        "tag": "agent:ip"
    },
    {
        "tag": "agent:role"
    },
    {
        "tag": "agent:*",
        "agent_id": "999997"
    },
    {
        "ping_target_alarm:*",
        "agent_id": "999997"
    },
    {
        "generate_vlt:*",
        "agent_id": "999997"
    },
    {
        "sampleapp_watch:*",
        "agent_id": "999997"
    },
    {
        "sampleapp:*",
        "agent_id": "999997"
    },
    {
        "m80:*",
        "agent_id": "999997"
    },
    {
        "health:*"
        "agent_id": "999997"
    }
    ]
}
```

FIG. 3 is a flow chart describing an example method 300 according to aspects of the present application. In examples, the operations of method 300 may be performed by one or more of the components of configuration system 202. As discussed, components of configuration system 202 may be comprised of one or more computing systems, including configuration provisioning system 106, intermediate server(s) 110, and/or edge node(s) 112, 114.

Flow begins at operation 302, where a configuration input interface is provided. In examples, configuration definition tool 214 may comprise one or more systems for allowing users to define configuration tags and store such tags in one or more configuration document(s) 212 in a configuration data store 210. In examples, the configuration definition tool 214 may store or have access to a configuration specification 217. The configuration specification 217 may be similar to a JSON schema, but configuration specification 217 may allow for encoding of additional metadata about a tag. In examples, the configuration specification 217 lists the tags that are permitted to be defined for a particular configuration document 212. In some examples, the configuration definition tool 214 may also include an interface that is accessible, e.g., by administrator system 108, to configure tags according to what is permitted by the configuration specification 217. In examples, the interface may comprise a graphical user interface, an application programming interface, or otherwise. In examples, the configuration definition tool 214 may enforce any rules for configuration tag(s) or configuration document(s) 212 that are required by the schema. For example, the configuration definition tool 214 may require that any tags to be stored in a configuration document 212 meet certain minimum requirements or particular syntax(es) before being accepted and stored.

Flow proceeds to operation 304, where configuration tags are received through the configuration input interface. For examples, the configuration tags may be defined using administrator system 108 and configuration definition tool 214, as described above.

Flow proceeds to operation 306, where at least one configuration document is stored that includes a plurality of configuration tags. In examples, configuration tags are stored in configuration documents 212 in configuration data store 210. As discussed, the tags that are defined through configuration definition tool 214 may be stored in such configuration documents 212. In other examples, the configuration documents 212 may be received from one or more other components and stored at operation 306. As discussed, the configuration document(s) comprise a non-relational, text-based data format, and, for each configuration tag of the plurality of configuration tags, a configuration tag name and a configuration setting array. In examples, the configuration setting array comprises at least one configuration value and at least one configuration scope.

Flow proceeds to operation 308, where a first configuration document is sent to a first intermediate server and a second configuration document is sent to a second intermediate server. In the example method 300, multiple intermediate servers (such as intermediate server(s) 110) are employed. In some examples, method 300 may be practiced without intermediate servers, and operation 308 may be omitted. As discussed, operation 308 may include filtering configuration tags and/or settings that are included in configuration document(s) stored at a higher-level system (e.g., configuration provisioning system 106) to only those tags/settings that are relevant to particular intermediate server(s) 110. For example, the first configuration document that is sent to the first intermediate server may be different from the second configuration document that is sent to the second intermediate server because the configuration tags/settings stored at the configuration provisioning system 106 may first be filtered to include only those relevant to a particular intermediate server 110.

Flow proceeds to operation 310, where a first subset of the configuration tags is determined to be applicable to a first edge node. In examples, operation 310 may comprise determining a first set of agents operating at the first edge node and determining that the first subset of the configuration tags is applicable to the first set of agents. In examples, this may include receiving a query for configuration tags from the first edge node. In examples, operation 310 may also include reading the first configuration document to determine any configuration scope satisfied by an agent of the first set of agents. In examples, the first set of agents may include a first set of computing machines at the first edge node and/or a first set of applications operating on such first set of computing machines. In examples, determining the first subset may include determining the applicability of configuration tags based on information encoded in the configuration tag names.

Flow proceeds to operation 312, where a second subset of the configuration tags is determined to be applicable to a second edge node. In examples, operation 312 is similar to operation 310, but for the second subset of the configuration tags that are applicable to the second edge node.

Flow proceeds to operation 314, where at least a first CTV pair is provided for the first subset of configuration tags. In examples, operation 314 may be performed by the configuration extraction tool 204. As discussed, the configuration extraction tool 204 may include an API 206 via which configuration tag consumer(s) (such as agent(s)) may request configuration tag-value (CTV) pairs or configuration files. For example, an agent or other configuration tag consumer (e.g., a particular server of edge node 112 or 114, a particular port or Ethernet card thereof, a particular application operating thereon, etc.) may query the API 206 for the applicable value of one or more particular configuration tag(s). The configuration extraction tool 204 may access the applicable configuration document(s) 212 to determine the correct value for the configuration tag(s) based on the setting array(s) for the particular configuration tag(s) and other information passed with the request (e.g., an agent identifier (agent_id) for the requesting agent or the agent about which the configuration tag consumer is inquiring). Once the correct value(s) are determined, the CTV pair(s) may be returned to the requesting configuration tag consumer. In some examples, an agent (or other configuration tag consumer) may also submit through the API 206 a configuration file request, which may include an agent identifier (e.g., agent_id) value and an indication of a configuration file template that includes tag names for which values are needed. The configuration extraction tool may search the relevant configuration document(s) 212 for the tag names included in the specified configuration file template, substitute the correct value for the tag name in the configuration file template, and return a configuration file (e.g., the configuration file template with the applicable value(s) substituted for the tag name(s) in the template). Once the correct value(s) are determined, the CTV pair(s) may be returned to the requesting configuration tag consumer in the configuration file(s). In examples, a first CTV pair may be provided to the first edge node for a first application operating on first device of the edge node, and a different CTV pair may be provided to the first edge node for a second application operating on the same device. In some examples, as discussed, determining the correct value for a first configuration tag may include first determining the correct value for one or more other configuration tags that are used to define the configuration tag scope of the first configuration tag. In some examples, providing the first CTV pair may include sending the first CTV pair from the first intermediate node to the first edge node.

Flow proceeds to operation 316, where at least a second CTV pair is provided for the second subset of configuration tags. In examples, operation 316 may be similar to operation 314, but for CTV pair(s) for the second subset of configuration tags. In examples, one or more of the operations of method 300 may be repeated for additional configuration tags.

Figure 4:
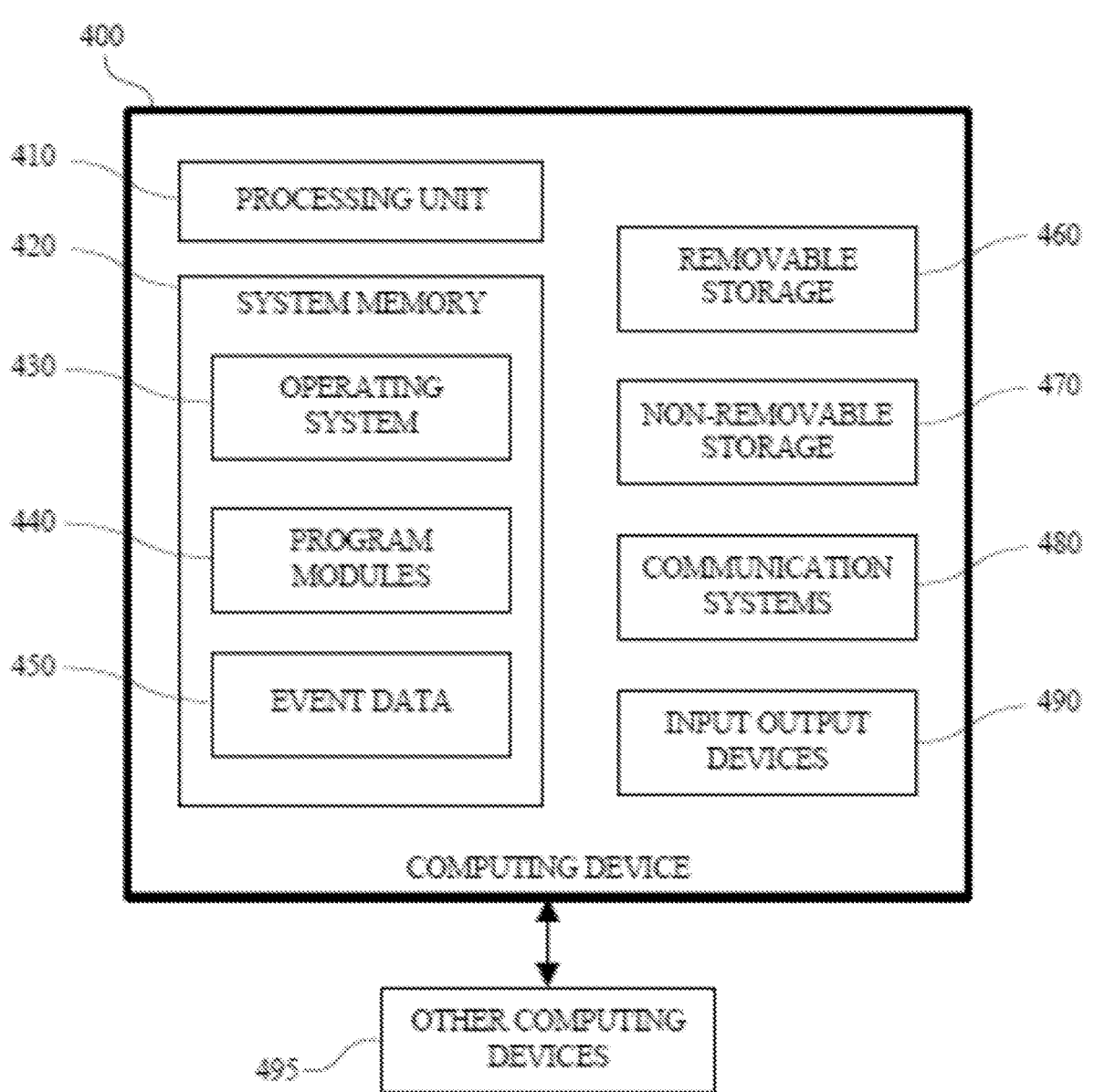
FIG. 4 is a block diagram describing a computing environment in which aspects of the present application may be practiced.

FIG. 4 is a block diagram illustrating physical components (i.e., hardware) of a computing device 400 with which examples of the present disclosure may be practiced. The computing device components described below may be suitable for a computing device(s) implementing one or more of the system 100, configuration provisioning system 106, administrator system 108, intermediate servers 110, edge nodes 112, 114, configuration system 202, or other components of FIGS. 1 and 2. As shown in FIG. 4, the physical components (e.g., hardware) of the computing device are illustrated and these physical components may be used to practice the various aspects of the present disclosure. The elements described above, may be implemented via one or more computing devices 400.

The computing device 400 may include at least one processing unit 410 and a system memory 420. Processing unit(s) 410 may comprise a processing circuit. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining event data 450 including endpoint data and/or network data. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, servers, routers, network devices, client computing devices, etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media is tangible and non-transitory, and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

In regards to the processes in the flow diagrams of FIG. 3, it should be understood that the sequence of steps of the processes are not fixed, but can be modified, changed in order, performed differently, performed sequentially, concurrently, or simultaneously, or altered into any desired sequence, as recognized by a person of skill in the art.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system, comprising:
   at least one processing circuit; and
   memory, operatively connected to the at least one processing circuit and storing instructions that, when executed by the at least one processing circuit, cause the system to perform a method, the method comprising:
   storing at least one configuration document comprising a plurality of configuration tags, wherein the at least one configuration document comprises a non-relational, text-based data format, and wherein, for each configuration tag of the plurality of configuration tags, a configuration tag name and a configuration setting array, and wherein the configuration setting array comprises at least one configuration value and at least one configuration scope;
   determining a first subset of the configuration tags of the at least one configuration document applicable to a first edge node of a network;
   determining a second subset of the configuration tags of the at least one configuration document applicable to a second edge node of the network;
   providing at least a first configuration tag-value (CTV) pair for the first subset of the configuration tags; and
   providing at least a second CTV pair for the second subset of the configuration tags, wherein providing the first CTV pair comprises:
   receiving a configuration file request, wherein the configuration file request comprises an indication of a configuration file template and at least one text string comprising a first configuration tag name;
   searching the at least one configuration document for the first configuration tag name;
   replacing the at least one text string in the configuration file template with the at least one configuration value for the first configuration tag name to generate a configuration file; and
   returning the configuration file.

2. The system of claim 1, wherein the method further comprises:
   providing, at a configuration provisioning system of a network, a configuration input interface, wherein the configuration input interface requires, for each configuration tag of the plurality of configuration tags, the configuration tag name and the configuration setting array;
   sending, by the configuration provisioning system and based on the at least one configuration document, a first configuration document to a first intermediate server and a second configuration document to a second intermediate server, wherein the first configuration document and the second configuration document are different;
   wherein the first intermediate server determines the first subset from the first configuration document and the second intermediate server determines the second subset from the second configuration document.

3. The system of claim 2, wherein determining, by the first intermediate server, the first subset comprises determining a first set of agents operating at the first edge node of the network and determining that the first subset is applicable to the first set of agents.

4. The system of claim 3, wherein determining, by the first intermediate server, the first subset comprises receiving at least one query for configuration tags from the first edge node.

5. The system of claim 3, wherein determining, by the first intermediate server, the first subset comprises searching the first configuration document for any configuration scope satisfied by an agent in the first set of agents.

6. The system of claim 5, wherein searching the first configuration document for any configuration scope satisfied by an agent in the first set of agents comprises determining that a first set of devices is operating at the first edge node and that a first set of applications is operating on the first set of devices at the first edge node.

7. The system of claim 6, wherein the first set of agents comprises a first application executing on a first device of the first edge node and a second application executing on the first device of the first edge node, and wherein providing at least the first configuration tag-value (CTV) pair for the first subset of the configuration tags comprises providing the first CTV pair for the first application and a third CTV pair for the second application.

8. The system of claim 7, wherein each of the configuration tag names of the plurality of configuration tags includes a domain and a property, and wherein the method further comprises determining that the first CTV pair is associated with the first application based on at least one of the domain or the property of a first configuration tag name.

9. The system of claim 1, wherein the plurality of configuration tags includes a first configuration tag, and the first configuration tag comprises a first setting array comprising a first configuration setting and a second configuration setting, and the first configuration setting comprises a first configuration value and a first configuration scope, and the second configuration setting comprises a second configuration value and a second configuration scope.

10. The system of claim 1, wherein:

the plurality of configuration tags comprises a first configuration tag and a second configuration tag;

the first configuration tag comprises a first configuration tag name, a first configuration tag value, and a first configuration tag scope; and the second configuration tag comprises a second configuration tag name, a second configuration tag value, and a second configuration tag scope that is defined based on the first configuration tag.

11. The system of claim 2, wherein providing the first CTV pair comprises sending the first CTV pair to the first edge node from the first intermediate node.

12. A method, comprising:

storing at least one configuration document comprising a plurality of configuration tags, wherein the at least one configuration document comprises a non-relational, text-based data format, and wherein, for each configuration tag of the plurality of configuration tags, a configuration tag name and a configuration setting array, and wherein the configuration setting array comprises at least one configuration value and at least one configuration scope;

determining a first subset of the configuration tags of the at least one configuration document applicable to a first edge node of a network;

determining a second subset of the configuration tags of the at least one configuration document applicable to a second edge node of the network;

providing at least a first configuration tag-value (CTV) pair for the first subset of the configuration tags; and providing at least a second CTV pair for the second subset of the configuration tags, wherein providing the first CTV pair comprises:

receiving a configuration file request, wherein the configuration file request comprises an indication of a configuration file template and at least one text string comprising a first configuration tag name;

searching the at least one configuration document for the first configuration tag name;

replacing the at least one text string in the configuration file template with the at least one configuration value for the first configuration tag name to generate a configuration file; and returning the configuration file.

13. The method of claim 12, further comprising:

providing, at a configuration provisioning system of a network, a configuration input interface, wherein the configuration input interface requires, for each configuration tag of the plurality of configuration tags, the configuration tag name and the configuration setting array;

sending, by the configuration provisioning system and based on the at least one configuration document, a first configuration document to a first intermediate server and a second configuration document to a second intermediate server, wherein the first configuration document and the second configuration document are different;

wherein the first intermediate server determines the first subset from the first configuration document and the second intermediate server determines the second subset from the second configuration document.

14. The method of claim 13, wherein determining, by the first intermediate server, the first subset comprises determining a first set of agents operating at the first edge node of the network and determining that the first subset is applicable to the first set of agents.

15. The method of claim 14, wherein determining, by the first intermediate server, the first subset comprises searching the first configuration document for any configuration scope satisfied by an agent in the first set of agents.

16. The method of claim 15, wherein searching the first configuration document for any configuration scope satisfied by an agent in the first set of agents comprises determining that a first set of devices is operating at the first edge node and that a first set of applications is operating on the first set of devices at the first edge node.

17. The method of claim 13, wherein providing the first CTV pair comprises sending the first CTV pair to the first edge node from the first intermediate node.

18. A method, comprising:

providing, at a configuration provisioning system of a network, a configuration input interface, wherein the configuration input interface requires, for each configuration tag of a plurality of configuration tags, a configuration tag name and a configuration setting array;

storing at least one configuration document comprising the plurality of configuration tags, wherein the at least one configuration document comprises a non-relational, text-based data format, and wherein, for each configuration tag of the plurality of configuration tags, the configuration tag name and the configuration setting array, and wherein the configuration setting array comprises at least one configuration value and at least one configuration scope;

sending, by the configuration provisioning system and based on the at least one configuration document, a first configuration document to a first intermediate server and a second configuration document to a second intermediate server, wherein the first configuration document and the second configuration document are different;

determining a first subset of the configuration tags of the at least one configuration document applicable to a first edge node of the network, wherein the first intermediate server determines the first subset from the first configuration document;

determining a second subset of the configuration tags of the at least one configuration document applicable to a second edge node of the network, wherein the second intermediate server determines the second subset from the second configuration document;

providing at least a first configuration tag-value (CTV) pair for the first subset of the configuration tags; and providing at least a second CTV pair for the second subset of the configuration tags, wherein providing the first CTV pair comprises:

receiving a configuration file request, wherein the configuration file request comprises an indication of a configuration file template and at least one text string comprising a first configuration tag name;

searching the at least one configuration document for the first configuration tag name;

replacing the at least one text string in the configuration file template with the at least one configuration value for the first configuration tag name to generate a configuration file; and returning the configuration file.

* * * * *